United States Patent
Ogatsu et al.

(10) Patent No.: US 8,947,875 B2
(45) Date of Patent: Feb. 3, 2015

(54) PORTABLE DEVICE

(75) Inventors: Toshinobu Ogatsu, Tokyo (JP);
Takeharu Kitagawa, Tokyo (JP);
Takeshi Komatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 220 days.

(21) Appl. No.: 13/635,206

(22) PCT Filed: Apr. 7, 2011

(86) PCT No.: PCT/JP2011/002073
§ 371 (c)(1),
(2), (4) Date: Sep. 14, 2012

(87) PCT Pub. No.: WO2011/145260
PCT Pub. Date: Nov. 24, 2011

(65) Prior Publication Data
US 2013/0010431 A1 Jan. 10, 2013

(30) Foreign Application Priority Data
May 20, 2010 (JP) ................................. 2010-116122

(51) Int. Cl.
*G06F 1/16* (2006.01)
*H04M 1/02* (2006.01)
(52) U.S. Cl.
CPC ........... *H04M 1/0237* (2013.01); *G06F 1/1624* (2013.01)
USPC .................................. 361/679.55; 455/575.4
(58) Field of Classification Search
USPC .............................................. 361/727, 679.55
See application file for complete search history.

(56) References Cited

U.S. PATENT DOCUMENTS

| | | | |
|---|---|---|---|
| 6,381,128 B1 * | 4/2002 | Kramer | 361/679.55 |
| 6,768,635 B2 * | 7/2004 | Lai et al. | 361/679.11 |
| 7,583,496 B2 * | 9/2009 | Lai | 361/679.3 |
| 7,653,422 B2 * | 1/2010 | Roberts | 455/575.4 |
| 8,208,244 B2 * | 6/2012 | Wu et al. | 361/679.01 |
| 8,724,316 B2 * | 5/2014 | Ou | 361/679.56 |
| 2004/0157653 A1 * | 8/2004 | Kato | 455/575.4 |
| 2005/0215298 A1 | 9/2005 | Lee | |
| 2006/0120029 A1 * | 6/2006 | Ryu et al. | 361/680 |

(Continued)

FOREIGN PATENT DOCUMENTS

| | | |
|---|---|---|
| CN | 1964374 A | 5/2007 |
| CN | 101652979 A | 2/2010 |
| JP | 2003-234809 A | 8/2003 |
| JP | 2005-269566 A | 9/2005 |

(Continued)

OTHER PUBLICATIONS

International Search Report in PCT/JP2011/002073 dated Jul. 5, 2011 (English Translation Thereof).

*Primary Examiner* — Lisa Lea Edmonds
(74) *Attorney, Agent, or Firm* — McGinn IP Law Group, PLLC

(57) ABSTRACT

A portable device includes a first unit including a guide member with a groove; a second unit including a sliding member that slides in the groove of each guide member; and a shield member that shields a boundary portion formed when the second unit is inclined at a predetermined angle with respect to the first unit in an extended state. The groove of the guide member includes a curved section that makes the first unit incline at a predetermined angle with respect to the second unit. One end of the shield member is rotatably supported at an end of the second unit, and the other end is slidably engaged with the groove of the guide member.

20 Claims, 9 Drawing Sheets

(56) References Cited

U.S. PATENT DOCUMENTS

| | | | |
|---|---|---|---|
| 2010/0120479 A1* | 5/2010 | Ogatsu | 455/575.4 |
| 2010/0134973 A1* | 6/2010 | Lee | 361/679.56 |
| 2010/0265688 A1* | 10/2010 | Endo et al. | 361/809 |
| 2011/0164352 A1* | 7/2011 | Ma et al. | 361/679.01 |
| 2011/0188187 A1* | 8/2011 | Barnett et al. | 361/679.01 |
| 2013/0005410 A1* | 1/2013 | Ogatsu | 455/575.4 |
| 2013/0010430 A1* | 1/2013 | Ogatsu | 361/727 |

FOREIGN PATENT DOCUMENTS

| | | |
|---|---|---|
| JP | 2005-286994 A | 10/2005 |
| JP | 2006-005564 A | 1/2006 |
| JP | 2006-186577 A | 7/2006 |
| JP | 2007-074411 A | 3/2007 |
| JP | 2008-113067 A | 5/2008 |
| WO | WO2008/120701 A1 | 10/2008 |
| WO | WO 2010/032864 A1 | 3/2010 |

\* cited by examiner

231

250  220  240

PORTABLE DEVICE

TECHNICAL FIELD

The present invention relates to a portable device such as a mobile phone, a digital camera, and an electronic personal organizer, and more particularly, to a sliding mechanism for these portable devices.

BACKGROUND ART

In recent years, the intended purpose of portable devices is not limited to simple telephone calls, but includes wide range of other purposes including transmission/reception of electronic mails, connection to the Internet, and video game functions. Therefore, the development of portable devices having various mechanisms for satisfying both the portability and the operability such as large screen display and a character input function has been in progress.

For example, there is a folding-type portable device, which is usually carried in a folded state. Then, when it is used for a telephone call or mail transmission/reception, it is extended so that the display unit and the operation unit are exposed and various operations can be thereby performed. The folding-type portable device can prevent incorrect operations from being performed when it is carried. However, when it is in the folded state, the display unit is not exposed. Therefore, it is impossible to perform almost all the functions. Therefore, it is necessary to separately provide another display unit that can be viewed in the folded state.

In contrast to this, as for a slide-type portable device, the display unit is always exposed irrespective of whether the portable device is in a retracted state or in an extended state. Therefore, the display unit can be viewed in any state. By providing a minimum key operation unit at the bottom of the display unit, certain operations such as reading an electronic mail and performing an operation on the Internet can be performed, even when it is in the retracted state, i.e., when it is being carried, without changing the portable device from the retracted state. Therefore, the usability is improved. Further, when a user performs an operation such as creating a mail document, the display unit and the key operation unit are slid in parallel so that another key operation unit disposed below the liquid crystal unit is exposed and the user can operate that key operation unit (see Patent literature 1).

In contrast to this, since the full length of the folding-type portable device in the extended state becomes almost twice as long as the length in the folded state, it is possible to secure a large key operation surface. Further, it is possible to dispose the display unit at a certain angle with respect to the operation unit. Therefore, the folding-type portable device has excellent usability both when an operation is performed and when a telephone call is carried out. Further, as a technique in which this feature of the folding-type portable device is incorporated into the slide-type portable device, there are a technique that enables the display unit to be completely detached from the key operation unit (see Patent literature 2) and a technique that enables the display unit to be disposed at a certain angle with respect to the key operation unit (see Patent literatures 3, 4, 6, and 7). Further, Patent literature 5 discloses a technique that enables a portable device to have a large inclination angle after a sliding action is performed.

CITATION LIST

Patent Literature

Patent literature 1: Japanese Unexamined Patent Application Publication No. 2005-286994
Patent literature 2: Japanese Unexamined Patent Application Publication No. 2003-234809
Patent literature 3: Japanese Unexamined Patent Application Publication No. 2005-269566
Patent literature 4: Japanese Unexamined Patent Application Publication No. 2006-005564
Patent literature 5: Japanese Unexamined Patent Application Publication No. 2008-113067
Patent literature 6: Japanese Unexamined Patent Application Publication No. 2006-186577
Patent literature 7: Japanese Unexamined Patent Application Publication No. 2007-074411

SUMMARY OF INVENTION

Technical Problem

In the slide-type portable device, when a lower unit (key operation surface) is inclined at a predetermined angle with respect to an upper unit (display unit), a gap is formed at a boundary portion between the upper unit and the lower unit. Moreover, there is a problem that electromechanical components, such as a cable for connecting the upper unit and the lower unit and a sliding mechanism, are exposed to the outside from this gap. If the electromechanical components or the like are exposed to the outside, dust enters the electromechanical components or the like, which causes a failure in the electromechanical components or the like.

Patent literature 6 discloses a technique for shielding, from the outside, the gap formed at the boundary portion between the upper unit and the lower unit. In the technique disclosed in Patent literature 6, however, a shielding mechanism is housed in the lower unit. This causes a problem that the lower unit is increased in thickness, resulting in an increase in the overall thickness of the portable device.

In view of the above-mentioned problem, an object of the present invention is to provide a mobile terminal capable of shielding a boundary portion between an upper unit and a lower unit of the portable device from an outside without increasing the overall thickness of the portable device.

Solution to Problem

A portable device according to the present invention includes: a first unit including a guide member with a groove, the first unit extending in a sliding direction; a second unit including a sliding member that slides in the groove of the guide member; and a shield member that shields a boundary portion between the first unit and the second unit in an extended state where the first unit is extended with respect to the second unit, the boundary portion being formed when the second unit is inclined at a predetermined angle with respect to the first unit. The groove of the guide member includes a curved section that makes the first unit incline at the predetermined angle with respect to the second unit in the extended state. One end of the shield member is rotatably supported at an end of the second unit, and the other end of the shield member is slidably engaged with the groove of the guide member.

Advantageous Effects of Invention

According to the present invention, it is possible to provide a portable device capable of shielding a boundary potion between an upper unit and a lower unit of the portable device from an outside without increasing the overall thickness of the portable device.

DESCRIPTION OF EMBODIMENTS

Figure 1:
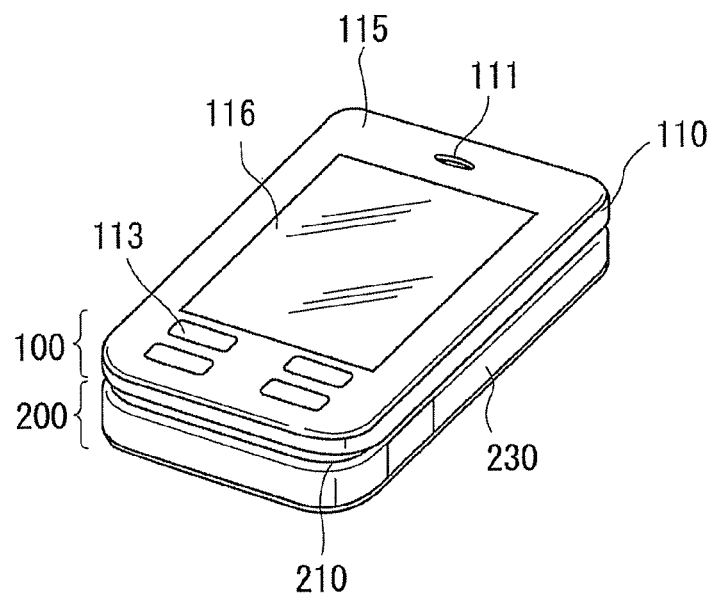
FIG. 1 is a perspective view showing a retracted state of a portable device according to an exemplary embodiment.
Figure 2:
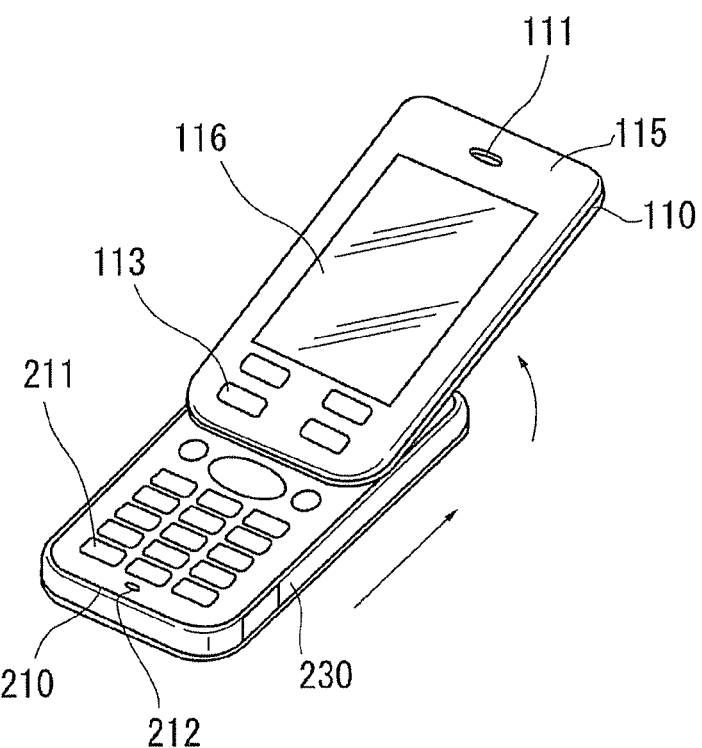
FIG. 2 is a perspective view showing an extended state of the portable device according to an exemplary embodiment.

Exemplary embodiments of the present invention will be described below with reference to the drawings. FIG. 1 is a perspective view showing a retracted state of a portable device according to this exemplary embodiment. FIG. 2 is a perspective view showing an extended state of the portable device according to this exemplary embodiment. As shown in FIGS. 1 and 2, the portable device according to this exemplary embodiment includes an upper unit (first unit) 100 and a lower unit (second unit) 200. The upper unit 100 includes an upper case 110 and an upper cover 115 that covers the upper case 110. The upper cover 115 is provided with a receiver sound hole 111, a display-unit cover 116, and a key operation unit 113. In the upper unit 100, a display unit, such as a liquid crystal display or an organic EL display, and a circuit board (not shown) having electronic components mounted thereon for transmission/reception and display are provided, for example.

The lower unit 200 includes a lower case 210 and a lower cover 230 that covers the lower case 210. As shown in FIG. 2, the lower case 210 is provided with a key operation unit 211 and a talk hole 212. The lower unit 200 incorporates major components, which are not shown, such as a battery, semiconductor components necessary for communication and software operations, a substrate having these components mounted thereon, an antenna, an external connection connector, and a vibration motor.

As shown in FIG. 1, the upper unit 100 and the lower unit 200 are disposed at positions that overlap each other when viewed from an upper surface (a position facing the upper cover 115) in the retracted state. As shown in FIG. 2, the upper unit 100 and the lower unit 200 are allowed to slide to positions that are shifted from each other when viewed from the upper surface in the extended state. Further, the upper unit 100 is inclined at a predetermined angle with respect to the lower unit 200 in the extended state.

Figure 3:
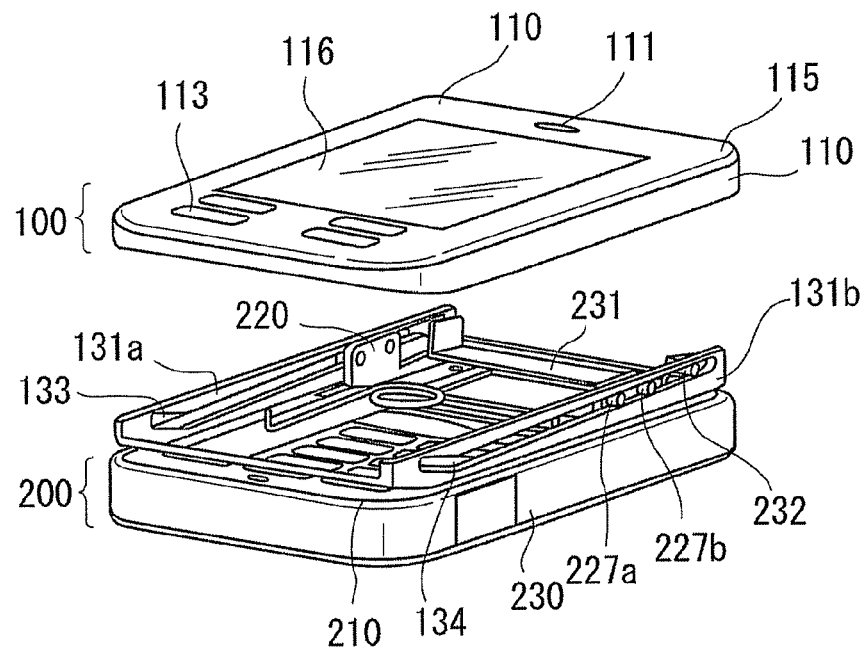
FIG. 3 is a perspective view showing an exploded state of the portable device according to an exemplary embodiment.

FIG. 3 is a perspective view showing an exploded state of the portable device according to this exemplary embodiment. FIG. 3 shows a state where the upper unit 100 is separated from the lower unit 200 and guide members 131a and 131b, which are mounted on the upper unit 100, are separated from the upper unit 100. As shown in FIG. 3, grooves 133 serving as raceway surfaces are formed in a pair of guide members 131a and 131b, which are symmetrically provided, in the longitudinal direction of the guide members 131a and 131b. Each groove 133 is provided with a curved section 134 which is moderately curved toward one end side. The guide members 131a and 131b are desirably made of stainless steel. Not only stainless steel, but metallic material including any of steel, aluminum alloy, magnesium alloy, and titanium alloy, for example, can also be used to form the guide members. In the case of mounting the guide members 131a and 131b on the upper unit 100, methods such as gluing, adhesion, and screw fixation can be used, for example.

As shown in FIG. 3, each sliding member 220 includes engaging sections 227a and 227b which project outward. These engaging sections 227a and 227b are slidably engaged with the respective grooves 133 of the guide members 131a and 131b. Here, the engaging sections 227a and 227b may be formed so as to contact one inner wall surface (upper wall surface) of the grooves 133 of the guide members 131a and 131b and an internal wall surface (lower wall surface) facing the one internal wall surface, or may be formed with a predetermined gap between the engaging sections 227a and 227b and at least one of the inner upper surface and the inner lower surface of the grooves 133. Further, shield member sliding pins 232, which are provided at both ends in the longitudinal direction of a shielding plate 231 provided to each sliding member 220, are slidably engaged with the grooves 133 of the guide members 131a and 131b. Specifically, the shield member sliding pins 232 may be formed so as to contact one inner wall surface (upper wall surface) of the grooves 133 of the guide members 131a and 131b and an internal wall surface (lower wall surface) facing the one internal wall surface, or may be formed with a predetermined gap between the shield member sliding pins 232 and at least one of the inner wall surface (upper wall surface) and the inner surface (lower wall surface) of the grooves 133. Note that in the state where the portable device is housed as shown in FIG. 3, the shielding plate 231 is folded to the inside of the lower unit 200. Both sides in the longitudinal direction of the shielding plate 231 are folded to the side of the upper unit 100. The wall surfaces formed by the folding are provided with the shield member sliding pins 232 so as to project outward from the wall surfaces.

As a countermeasure against abrasion caused when the engaging sections 227a and 227b and the shield member sliding pins 232 are allowed to slide in the grooves 133 of the guide members 131a and 131b, lubricant such as grease or oil can be used, or a fluorine-based lubrication treatment can be performed on each member, for example. Solid lubricant such as silicone-based, graphite-based, or molybdenum disulfide-based lubricant can also be used as lubricant.

Figure 4:
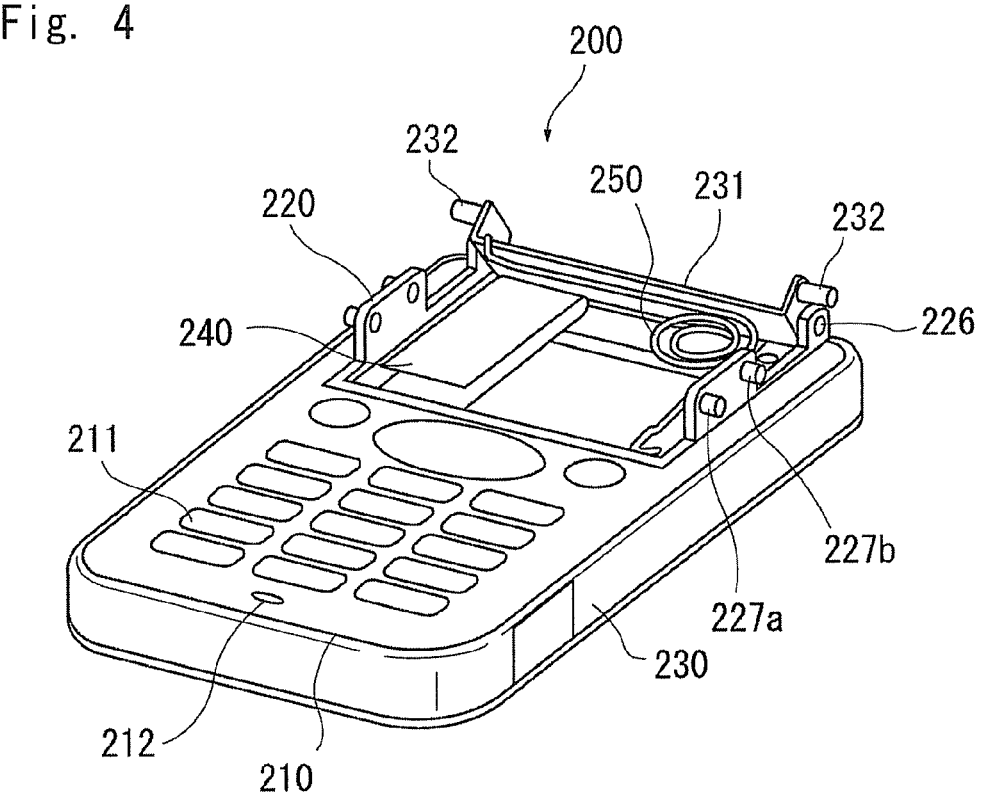
FIG. 4 is a perspective view showing a lower unit of the portable device according to an exemplary embodiment.
Figure 5:
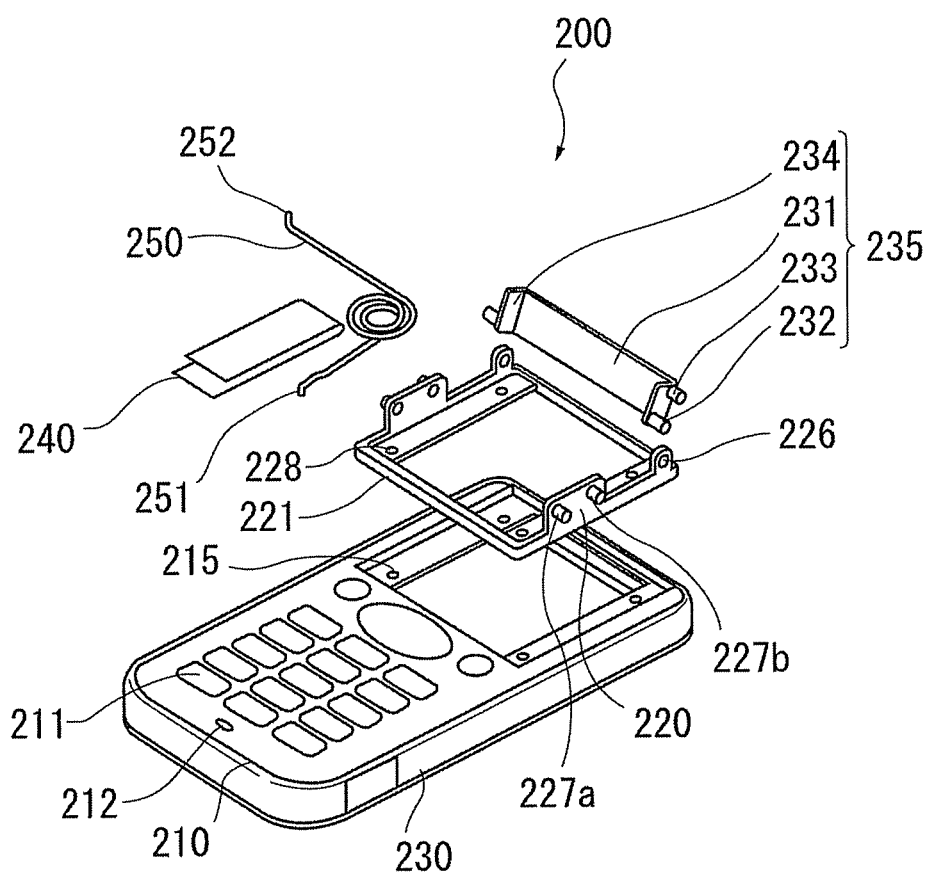
FIG. 5 is a perspective view showing an exploded state of the lower unit of the portable device according to an exemplary embodiment.

FIG. 4 is a perspective view showing the lower unit 200 of the portable device according to this exemplary embodiment. FIG. 5 is a perspective view showing an exploded state of the lower unit 200 of the portable device according to this exemplary embodiment. For example, plastic resin, magnesium alloy, aluminum alloy, stainless, or a hybrid unit of stainless and resin can be used for the lower case 210. As shown in FIGS. 4 and 5, each sliding member 220 includes the engaging sections 227a and 227b that are slidably engaged with the grooves 133 of the guide members 131a and 131b of the upper unit 100. Because the sliding member 220 is required to have sufficient strength, each sliding member 220 is desirably made of a metal component such as stainless, steel, aluminum alloy, or magnesium alloy.

As shown in FIG. 5, the engaging sections 227a and 227b can be formed by providing protrusions on the wall surfaces which are formed by folding both sides of a base 221 of the sliding members 220. The two engaging sections 227a and 227b are provided so as to be arranged side by side in a sliding direction. While FIGS. 4 and 5 illustrate two engaging sections 227a and 227b, the number of engaging sections is not limited to two and can be arbitrarily determined. While FIGS. 4 and 5 illustrate the engaging sections 227a and 227b each having a cylindrical shape, the shape of the engaging sections is not limited to the cylindrical shape, but may be an elliptic cylindrical shape, for example. The engaging sections 227a and 227b are provided with resin members or subjected to resin coating, thereby reducing the friction between the engaging sections 227a and 227b and the grooves 133 of the guide members 131a and 131b.

The portable device according to this exemplary embodiment includes a shield member 235. As shown in FIG. 5, the shield member 235 includes the shielding plate 231, the shield member sliding pins 232, rotating pins 233, and wall surfaces 234. The shield member 235 can also be formed of a metal component, like the sliding members 220. The shielding plate 231 is provided so as to extend in the direction perpendicular to the sliding direction. The wall surfaces 234, which are formed by folding the shielding plate 232, are provided at both sides in the longitudinal direction of the shielding plate 231. The wall surfaces 234 are provided with the shield member sliding pins 232 and the rotating pins 233 so as to project outward from the wall surfaces 234. The rotating pins 233 are provided so as to fit mounting holes 226 which are provided in the wall surfaces formed by folding the both sides of the base 221.

Note that the wall surfaces provided with the mounting holes 226 are opposed side surfaces, like the wall surfaces on which the sliding members 220 are formed. The shield member sliding pins 232 are provided to be slidably engaged with the grooves 133 of the guide members 131a and 131b. At this time, each shield member sliding pin 232 and each rotating pin 233 are diagonally provided on each wall surface 234 such that the rotating pin 233 is located on the side of the second unit 200 and the shield member sliding pin 232 is located on the side of the first unit 100. The shield member sliding pins 232 are formed to be longer than the rotating pins 233 and are slidably engaged with the grooves 133 of the guide members 131a and 131b.

Note that the wall surfaces 234 at both sides in the longitudinal direction of the shielding plate 231 are formed by folding the shielding plate 231 in the direction (that is, the first unit 100 side) opposite to the side where the shielding plate 231 is folded so that the shielding plate 231 is folded to the inside of the lower unit 200 in the retracted state of the portable device as shown in FIG. 3. This allows the shield member sliding pins 232 to be engaged with the grooves 133 of the guide members 131a and 131b even when the shielding plate 231 is in the folded state.

The shield member sliding pins 232 and the rotating pins 233 may be formed on the wall surfaces 234, which are formed by folding the both sides of the shielding plate 232 to the side of the first unit 100, so as to be firmly connected thereto outward, or may be integrally molded with the wall surfaces 234 formed by folding the both sides of the shielding plate 232.

While FIG. 5 illustrates that the mounting holes 226 for bonding the sliding members 220 to the shield member 235 are integrally formed with the sliding members 220, the sliding members 220 and the mounting holes 226 may be formed separately. In this case, each mounting hole 226 is provided at an end of the lower case 210, for example, so that the shield member 235 is folded to be housed in the lower case 210.

A resin material may also be used for the shield member 235. In this case, the strength is lowered but the quality in appearance can be further improved. Additionally, it is possible to suppress generation of sound in association with operation.

As shown in FIG. 4, the lower unit 200 is provided with a torsion spring 250. The torsion spring 250 is provided such that one end thereof contacts the surface where the key operation unit 211 of the base 211 of each sliding member 220 is provided, and the other end thereof contacts the upper unit 100 (FIG. 4 shows the extended state of the portable device). The provision of the torsion spring 250 can assist a manual operation when the upper unit 100 and the lower unit 200 are extended or retracted. Further, a connection cable 240 for transmitting electric signals between the upper unit 100 and the lower unit 200 is provided.

As shown in FIG. 5, mounting holes 228 (four in FIG. 5) for fixing each sliding members 220 to the lower case 210 are provided in the base 221 of each sliding member 220. Mounting parts 215 for fixing each sliding member 220 are also provided in the lower case 210 at positions corresponding to the respective mounting holes 228 of the sliding members 220. Fixing members, such as screws, are provided through the mounting holes 228 of the sliding members 220 and the mounting parts 215 of the lower case 210, thereby allowing the sliding members 220 to be fixed to the lower case 210. Note that the lower case 210 and the sliding members 220 can also be integrally formed using metal or the like.

Figure 6:
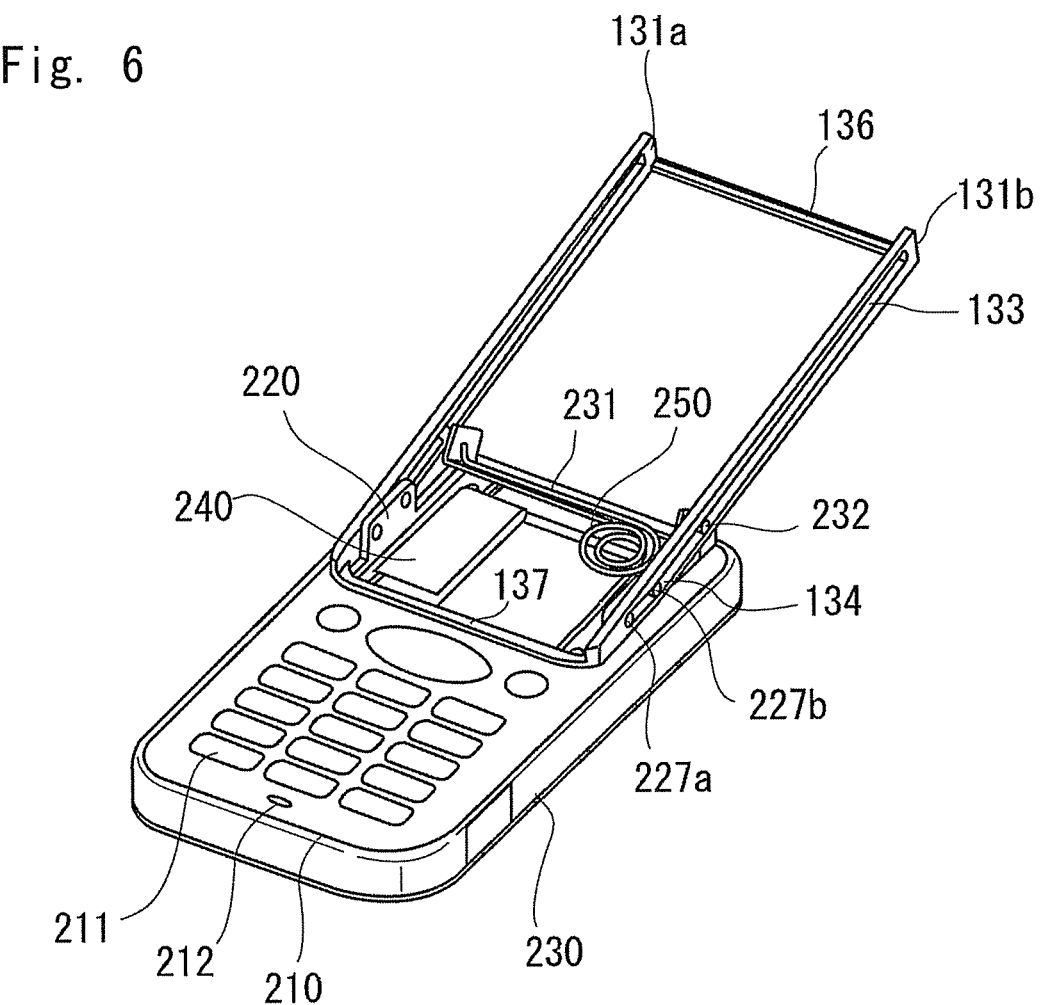
FIG. 6 is a perspective view showing a positional relationship between the lower unit and guide members of the portable device according to an exemplary embodiment.

FIG. 6 is a perspective view showing a positional relationship between the lower unit 200 and the guide members 131a and 131b according to this exemplary embodiment. FIG. 6 shows the extended state of the upper unit 100 and the lower unit 200. As shown in FIG. 6, in the extended state, the engaging sections 227a and 227b of each sliding member 220 are positioned at an end where the curved section 134 of the corresponding groove 133 of each of the guide members 131a and 131b is provided. At this time, the guide members 131a and 131b are included at a predetermined angle with respect to the lower unit 200. The shield member sliding pins 232 are engaged with the grooves 133 of the guide members 131a and 131b, and the guide members 131a and 131b are inclined at the predetermined angle with respect to the lower unit 200. Thus, the shield member sliding pins 232 are positioned at the upper side (first unit side). Accordingly, the shielding plate 231 is inclined at the predetermined angle with respect to the lower unit 200.

As shown in FIG. 6, the guide members 131a and 131b are connected at their ends with connecting members 136 and 137. The connection between the guide members 131a and 131b with the connecting members 136 and 137 improves the strength of the unit including the guide members 131a and 131b. Further, an inclined portion is provided to each of the guide members 131a and 131b on the side where the curved section 134 is provided, so as to prevent the guide members 131a and 131b from interfering with the lower unit 200 in the extended state of the portable device (see FIGS. 8A and 8B).

Figure 7A:
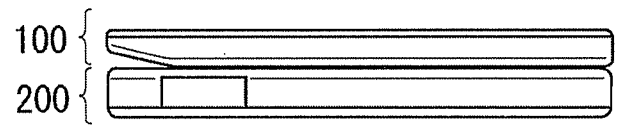
FIG. 7A is a side view for explaining an operation of the portable device according to an exemplary embodiment in the retracted state.
Figure 7B:
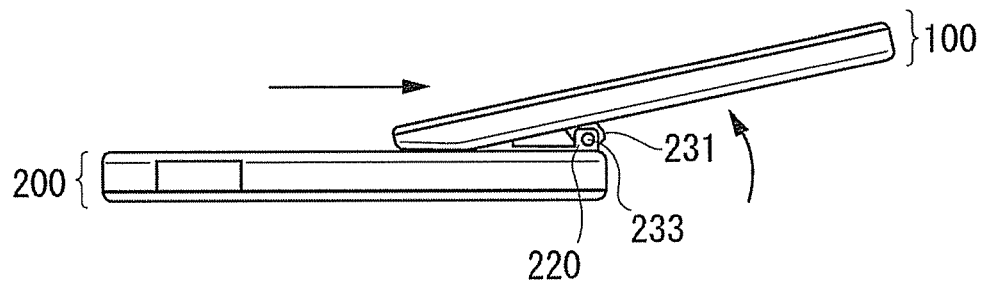
FIG. 7B is a side view for explaining an operation of the portable device according to an exemplary embodiment in the extended state.

Next, an operation of the portable device according to this exemplary embodiment will be described. FIGS. 7A and 7B are side views each showing an operation of the portable device according to this exemplary embodiment. FIG. 7A shows the retracted state of the portable device, and FIG. 7B shows the extended state of the portable device. In the retracted state shown in FIG. 7A, the upper unit 100 and the lower unit 200 are disposed at positions that overlap each other when viewed from the upper surface. In the extended state shown in FIG. 7B, the upper unit 100 is inclined at the predetermined angle with respect to the lower unit 200. At this time, the shielding plate 231 rotates around the rotating pins 233 along with the extension from the retracted state of the portable device, and the shielding plate 232 is inclined at the predetermined angle with respect to the lower unit 200 in the extended state shown in FIG. 7B. This makes it possible to shield a boundary portion between the upper unit 100 and the lower unit 200 of the portable device from the outside. At the left side in the figure of the upper unit 100, the same inclination as that of the inclined portion is provided to the guide members 131a and 131b. The provision of this inclination prevents the upper unit 100 from interfering with the lower unit 200 in the extended state.

Figure 8A:
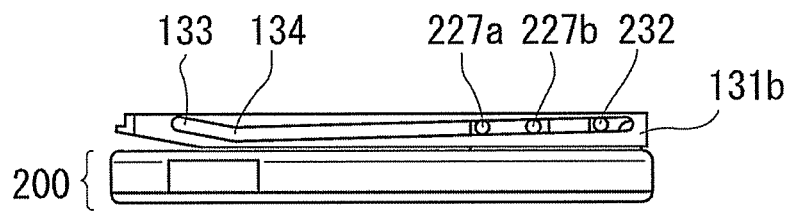
FIG. 8A is a view for explaining an operation of the portable device according to an exemplary embodiment in the retracted state.
Figure 8B:
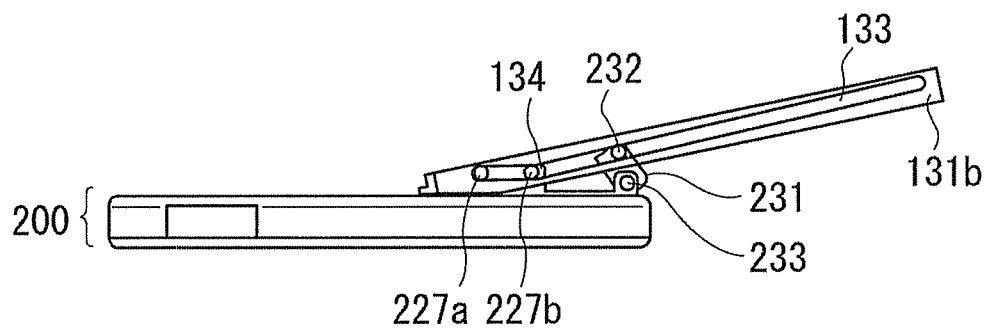
FIG. 8B is a view for explaining an operation of the portable device according to an exemplary embodiment in the extended state.

The operation at this time will be described in detail with reference to FIGS. 8A and 8B. FIGS. 8A and 8B are views showing operations of the lower unit 200 and the guide members 131a and 131b of the portable device according to this exemplary embodiment. FIGS. 8A and 8B are side views of the portable device. FIG. 8A shows the retracted state of the portable device, and FIG. 8B shows the extended state of the portable device. In the retracted state shown in FIG. 8A, the guide members 131a and 131b are disposed at positions that overlap the lower unit 200 when viewed from the upper surface. At this time, the engaging sections 227a and 227b are positioned at the right side in the figure of the corresponding groove 133.

When the guide members 131a and 131b are moved to the right side of the figure, the engaging sections 227a and 227b move along the grooves 133 and pass through each curved section 134, so that the guide members 131a and 131b are included as shown in FIG. 8B. At this time, the engaging sections 227a and 227b are positioned at the left side in the figure of the corresponding groove 133. Here, the grooves 133 of the guide members may be inclined at the predetermined angle with respect to the upper surface of each of the guide members 131a and 131b (corresponding to the principal surface (upper surface) of the upper unit 100) in the range from the position at the right side in the figure of the guide members 131a and 131b to each curved section 134. With the inclination at the predetermined angle in this manner, a gap is gradually formed between the upper unit 100 and the lower unit 200 during the sliding operation. This prevents the upper unit 100 from rubbing the key operation surface of the lower unit 200.

The engaging sections 227a and 227b may be configured such that a shaft rotates gently when the engaging sections 227a and 227b are allowed to slide in the grooves 133 of the guide members 131a and 131b. This prevents uneven wear of the engaging sections 227a and 227b. In this case, a lubricant bush may be inserted into the engaging sections 227a and 227b. The inclination angle of the upper unit 100 with respect to the lower unit 200 in the extended state of the portable device can be increased by increasing the curved angle of the curved section of each groove 133 of the guide members 131a and 131b and by decreasing the interval between the engaging section 227a and the engaging section 227b.

In FIGS. 8A and 8B, after the engaging sections 227a and 227b pass through the curved sections 134 of the grooves 133, the guide members 131a and 131b are inclined at the predetermined angle with respect to the lower unit 200. One end of the shield member 235 is rotatably supported by the rotating pins 233. At the other end thereof, the shield member sliding pins 232 are allowed to slide in the grooves 133 of the guide members 131a and 131b. When the engaging sections 227a and 227b pass through the curved sections 134 and the guide members 131a and 131b are inclined with respect to the lower unit 200, the shield member sliding pins 232, which are allowed to slide in the grooves 133 along with this operation, rotate around the rotating pins 233. That is, the positions of the shield member sliding pins 232 are moved to the upper unit side. At this time, the shielding plate 231 rotates around the ratable pins 233 and is inclined at the predetermined angle with respect to the lower unit 200.

Figure 9A:
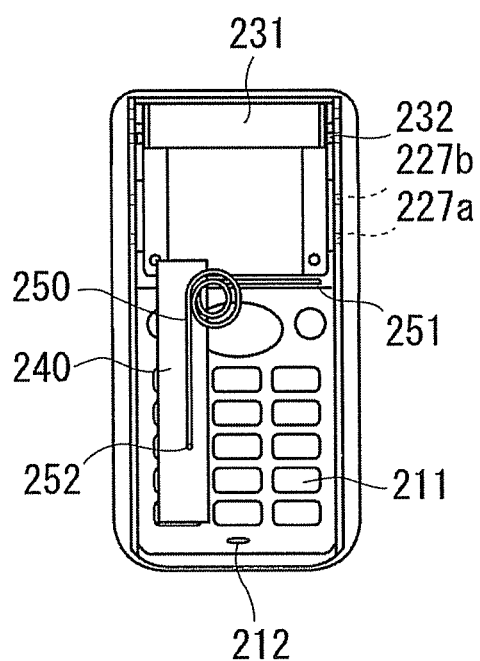
FIG. 9A is a top view for explaining an operation of the portable device according to an exemplary embodiment in the retracted state.
Figure 9B:
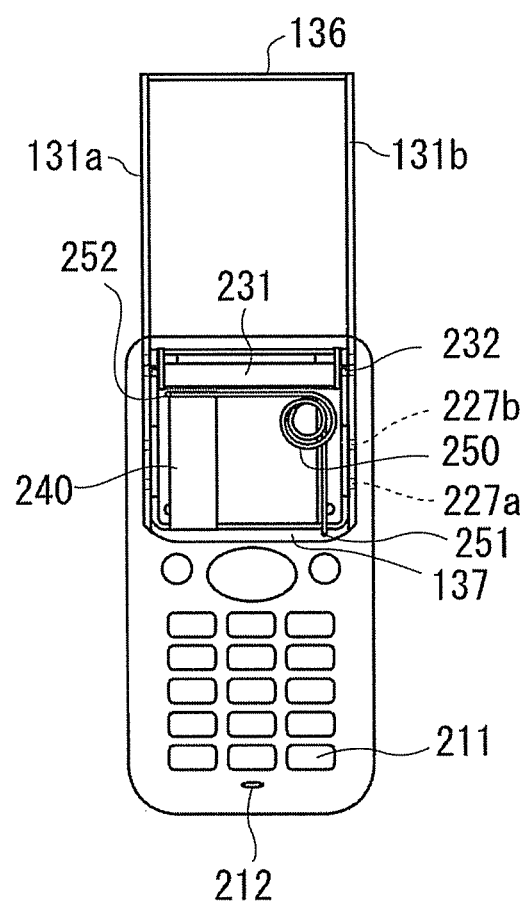
FIG. 9B is a top view for explaining an operation of the portable device according to an exemplary embodiment in the extended state.

FIGS. 9A and 9B are top views for explaining operations of the lower unit 200 and the guide members 131a and 131b of the portable device according to this exemplary embodiment. FIG. 9A shows the retracted state of the portable device, and FIG. 9B shows the extended state of the portable device. In the slide-type portable device, the connection cable 240 also moves along the housing and extending operations. In the retracted state of the portable device as shown in FIG. 9A, the connection cable 240 extends to a position that overlaps the key operation unit 211 of the lower unit 200. On the other hand, in the extended state of the portable device as shown in FIG. 9B, the connection cable 240 is folded and disposed at a position that does not overlap the key operation unit 211 of the lower unit 200.

One end 251 of the torsion spring 250 is connected to the lower unit, and the other end 252 thereof is connected to the upper unit. As shown in FIGS. 9A and 9B, the torsion spring 250 has a configuration in which the one end 251 is connected to the side of the key operation unit 211 of the base 221 and to a corner portion on the side of the sliding member 220 that is allowed to slide along the guide member 131b, and the other end 252 is connected to a predetermined location on the side of the connecting member 137 of the guide member 131a in a lower surface portion of a connecting plate 132 that constitutes the upper unit. Accordingly, in the retracted state of the portable device shown in FIG. 9A, a force is applied to maintain the retracted state of the portable device. When the portable device is gradually extended from the retracted state against the load of the torsion spring 250, the direction of the load of the torsion spring 250 is reversed at a predetermined position between the retracted state and the extended state, and the load is added in the extending direction. For this reason, manipulating the portable device to the position where the load is reversed enables the portable device to be automatically extended due to the load of the torsion spring 250. As shown in FIG. 9B, the torsion spring 250 rotates clockwise by 90 degrees around the end 251 in the extended state of the portable device, as compared with the retracted state.

Figure 10:
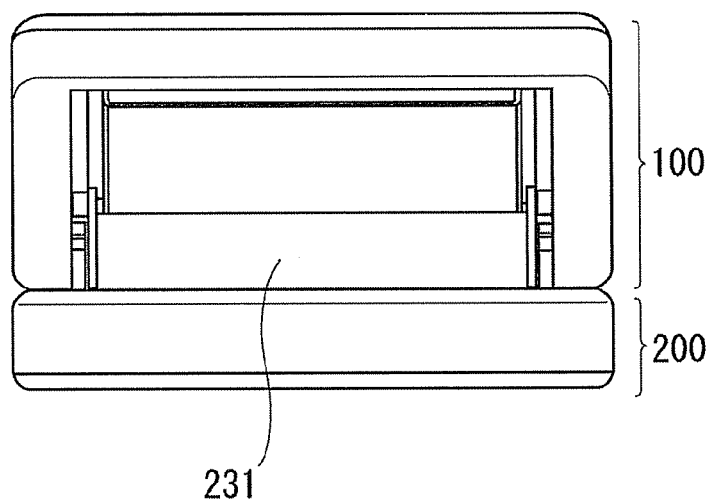
FIG. 10 is a front view showing the extended state of the portable device according to an exemplary embodiment.

FIG. 10 is a front view showing the extended state of the portable device according to this exemplary embodiment. FIG. 10 is a view showing the extended state of the portable device shown in FIG. 7B when viewed from the right side of the figure. As shown in FIG. 10, in the portable device according to this exemplary embodiment, the shielding plate 231 is inclined at the predetermined angle with respect to the lower unit 200 in the extended state of the portable device, thereby allowing the boundary portion between the upper unit 100 and the lower unit 200 of the portable device to be shielded from the outside. Therefore, it is possible to make the components, such as the torsion spring 250, the connection cable 240, and the sliding members 220, which are located in the boundary portion between the upper unit 100 and the lower unit 200, invisible from the outside, and to maintain the quality in appearance. It is also possible to prevent dust or the like from entering electromechanical components and to prevent a failure from occurring in the sliding mechanism of the portable device.

Figure 11:
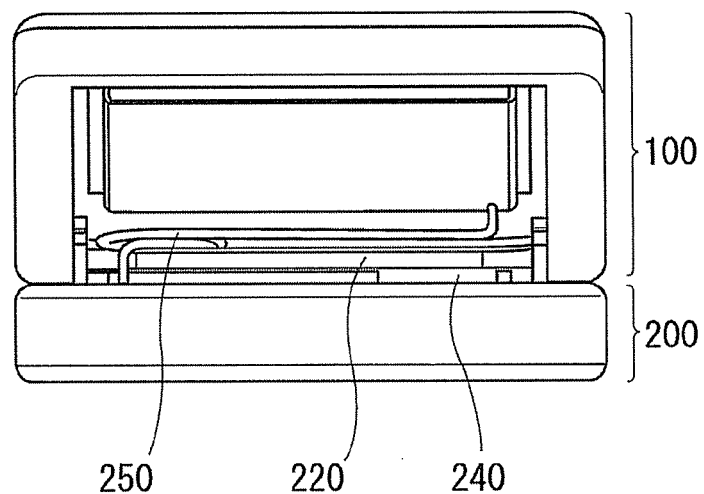
FIG. 11 is a front view showing an extended state of a portable device without using the present invention.

As a comparative example, FIG. 11 shows a front view showing the extended state of the portable device when the shielding plate 231 is not provided. As shown in FIG. 11, when the shielding plate 231 is not provided, the components such as the torsion spring 250, the connection cable 240, and the sliding members 220 are visible from the outside, which makes it difficult to maintain the quality in appearance. In addition, there is a possibility that dust or the like enters the electromechanical components, which causes a failure in the sliding mechanism of the portable device.

Figure 12A:
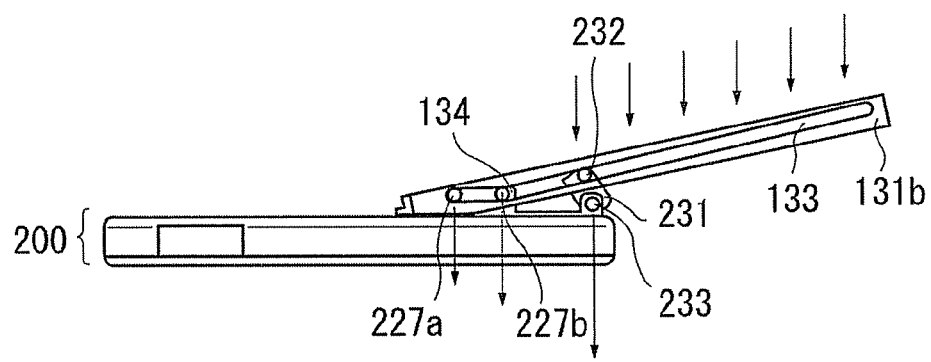
FIG. 12A is a view showing loads when distributed loads are added to an upper unit in the extended state of the portable device (in the case of the portable device according to the present invention)
Figure 12B:
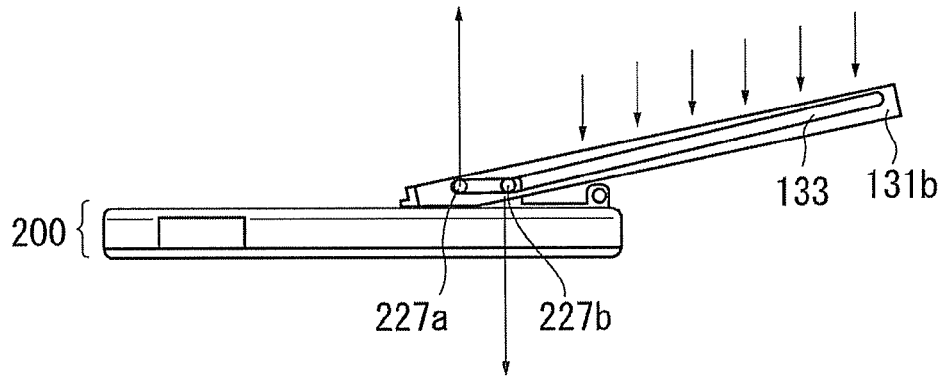
FIG. 12B is a view showing loads when distributed loads are added to the upper unit in the extended state of the portable device (in the case of the portable device without using the present invention (comparative example))

FIGS. 12A and 12B are side views showing the extended state of the portable device according to this exemplary embodiment when distributed loads are added to the upper unit. FIG. 12A shows the portable device according to this exemplary embodiment (when the shielding plate 231 is provided), and FIG. 12B shows the portable device when the shielding plate 231 is not provided (comparative example).

As shown in FIG. 12A, when the portable device according to this exemplary embodiment is viewed from a side surface, the line connecting the shield member sliding pin 232 and the rotating pins 233 is substantially perpendicular to the upper surface of each of the guide members 131a and 131b (corresponding to the principal surface (upper surface) of the upper unit 100). Here, the shield member sliding pin 232 and the rotating pin 233 are diagonally provided on each wall surface 234, which is formed by folding the shielding plate 231, such that the rotating pin 233 is located on the side of the second unit 200 and the shield member sliding pin 232 is located on the side of the first unit 100. Even when the angle formed between the upper surface of each of the guide members 131a and 131b and the shielding plate 231 is smaller than a right angle, the line connecting the shield member sliding pin 232 and the rotating pin 233 can be made substantially perpendicular to the upper surface of each of the guide members 131a and 131b.

In this manner, the line connecting the shield member sliding pin 232 and the rotating pin 233 is made substantially perpendicular to the upper surface of each of the guide members 131a and 131b, thereby allowing the shield member 235 and the engaging sections 227a and 227b to receive loads even when distributed loads (indicated by arrows) act on the upper surface of each of the guide members 131a and 131b. Thus, the loads applied onto the upper surface of each of the guide members 131a and 131b can be distributed.

On the other hand, in the comparative example shown in FIG. 12B, the shielding plate 231 is not provided. Accordingly, when distributed loads (indicated by arrows) act on the upper surface of each of the guide members 131a and 131b, a large force acts upward on the engaging section 227a with the engaging section 227b as a fulcrum. As a result, the strength against the load of the portable device decreases.

Figure 13A:
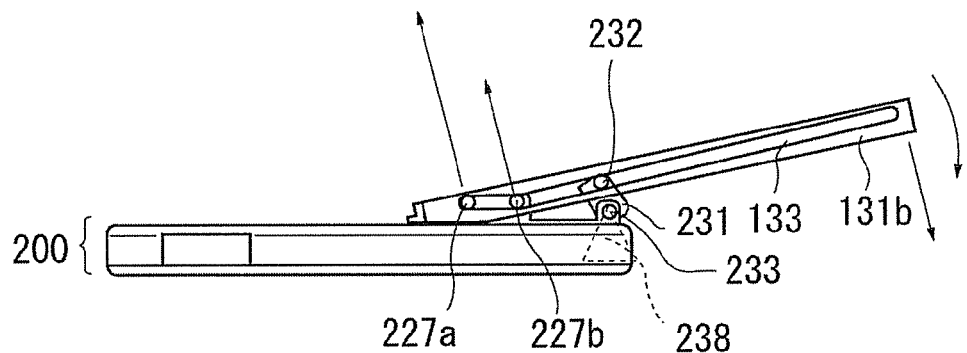
FIG. 13A is a side view showing moment loads when a concentrated load is added to an end of the upper unit in the extended state of the portable device (in the case of the portable device according to the present invention)
Figure 13B:
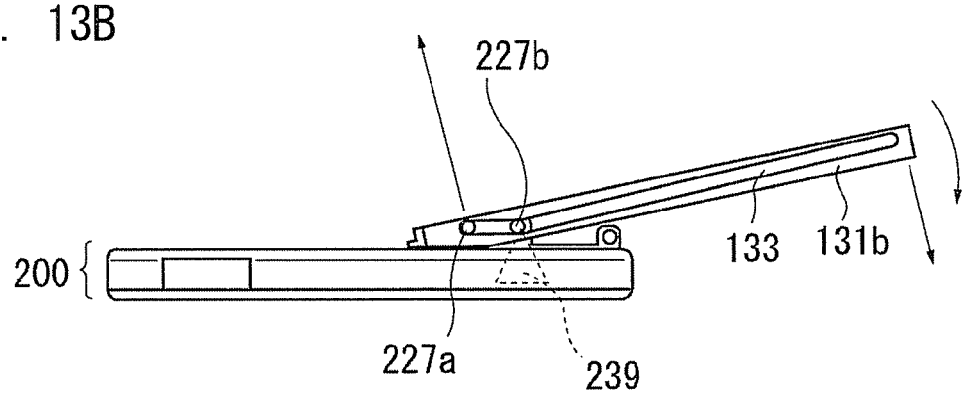
FIG. 13B is a side view showing moment loads when a concentrated load is added to an end of the upper unit in the extended state of the portable device (in the case of the portable device without using the present invention (comparative example))

FIGS. 13A and 13B are views each showing moment loads when a concentrated load is added to an end of the upper unit in the extended state of the portable device according to an exemplary embodiment. FIG. 13A shows the portable device according to this exemplary embodiment (when the shielding plate 231 is provided), and FIG. 13B shows the case where the shielding plate 231 is not provided (comparative example).

As shown in FIG. 13A, when the portable device according to this exemplary embodiment is viewed from a side surface, the line connecting the shield member sliding pin 232 and the rotating pin 233 is substantially perpendicular to the upper surface of each of the guide members 131a and 131b (the same holds true for the principal surface (upper surface) of the upper unit 100). In this manner, the line connecting the shield member sliding pin 232 and the rotating pin 233 is made substantially perpendicular to the upper surface of each of the guide members 131a and 131b, thereby allowing the engaging sections 227a and 227b to receive the loads, with the shield member 235, which includes the shielding plate 231, the shield member sliding pins 232, and the rotating pins 233, serving as a fulcrum 238, even when moment loads (indicated by arrows) act on the right end of the upper surface of each of the guide members 131a and 131b. In short, two points of the engaging sections 227a and 227b serve as points of action, thereby enabling reception of the moment loads in a distributed manner. Additionally, the engaging sections 227a and 227b are spaced away from the fulcrum 238, thereby reducing the moment loads to be received.

On the other hand, in the comparative example shown in FIG. 13B, the shielding plate 231 is not provided. Accordingly, when moment loads (indicated by arrows) act on the right end of the upper surface of each of the guide members 131a and 131b, a large force acts upward on the engaging section 227a, with the engaging section 227b serving as a fulcrum 239. As a result, the strength against the load of the portable device decreases.

In sum, in the portable device according to this exemplary embodiment, the shield member 235 serves as the fulcrum 238, which makes it possible to reduce the load to be applied to the engaging section 227a as compared with the case where the engaging section 227b serves as the fulcrum 239.

The portable device according to this exemplary embodiment described above can be configured such that the shielding plate 231 is folded in the retracted state of the portable device and the shielding plate 231 is inclined with respect to the lower unit 200 in the extended state of the portable device. Therefore, it is possible to make the components, such as the torsion spring 250, the connection cable 240, and the sliding members 220, which are located in the boundary portion between the upper unit 100 and the lower unit 200, invisible from the outside, and to maintain the quality in appearance. It is also possible to prevent dust or the like from entering the electromechanical components and to prevent a failure from occurring in the sliding mechanism of the portable device.

Consequently, according to the portable device of this exemplary embodiment, it is possible to provide a portable device capable of shielding a boundary portion between an upper unit and a lower unit of the portable device from the outside without increasing the overall thickness of the portable device.

In the portable device according to this exemplary embodiment, the line connecting each shield member sliding pin 232 and each rotating pins 233 is made substantially perpendicular to the upper surface of each of the guide members 131a and 131b (corresponding to the principal surface (upper surface) of the upper unit 100), thereby improving the strength of the portable device. Generally (when the shield member sliding pins 232 and the rotating pins 233 are not provided), in the case of increasing the inclination angle of the lower unit 200 with respect to the upper unit 100 in the extended state of the portable device, it is necessary to increase the angle of the curved section 134 of each groove 133 of the guide members 131a and 131b and to reduce the distance between the engaging section 227a and the engaging section 227b. When the distance between the engaging section 227a and the engaging section 227b is reduced in this manner, the principle of leverage works on the load applied to the upper unit 100, with the engaging section 227b as a fulcrum. This results in an increase in the load acting on the engaging section 227a. Therefore, it is necessary to increase the strength of the components constituting the sliding mechanism so as to increase the inclination angle.

On the other hand, in the portable device according to this exemplary embodiment, the line connecting each shield member sliding pin 232 and each rotating pin 233 is made substantially perpendicular to the upper surface of each of the guide members 131a and 131b, thereby allowing the engaging sections 227a and 227b to receive the loads, with the shield member 235, which includes the shielding plate 231, the shield member sliding pins 232, and the rotating pins 233, serving as a fulcrum, even when the loads act on the upper surface of the upper unit 100. Therefore, according to the portable device of this exemplary embodiment, it is possible to provide a sliding mechanism including a tilt mechanism and to ensure the strength of the sliding mechanism.

Figure 14:
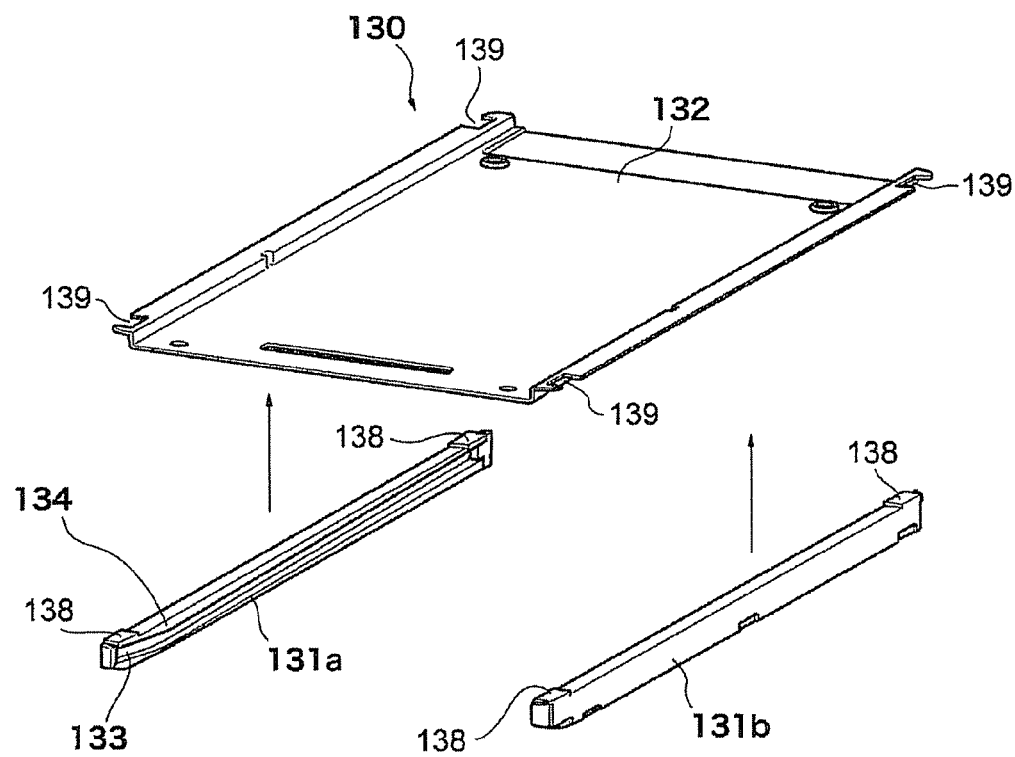
FIG. 14 is a perspective view showing a guide member according to another aspect of the portable device according to an exemplary embodiment.

Note that the guide members 131a and 131b according to this exemplary embodiment may have a configuration as shown in FIG. 14, for example. FIG. 14 is a perspective view showing an exploded state of a guide member unit according to another aspect of the portable device of this exemplary embodiment. A guide member unit 130 includes the guide members 131a and 131b and the connecting plate 132. The connecting plate 132 is configured to be mountable to the upper case 110. The connecting plate 132 and the guide members 131a and 131b are desirably made of stainless steel. Not only stainless steel, but metallic material including any of steel, aluminum alloy, magnesium alloy, and titanium alloy, for example, can also be used to form the guide members. In the case of mounting the guide members 131a and 131b on the upper unit 100, methods such as gluing, welding, and screw fixation can be used, for example. Because the thickness of the connecting plate 132 directly affects the thickness of the fabricated device, it is desirable to reduce the thickness of the connecting plate 132 so as to reduce the thickness of the portable device. The guide members 131a and 131b can be fabricated by cutting, forging, or casting, for example.

When the connecting plate 132 and the guide members 131a and 131b are made of stainless steel, they can be fixed by welding. The fixation by welding enables resistance against a large load even in a small connection area. If a sufficient connection area is ensured, fixation using adhesive, adhesion, and caulking, for example, can also be employed as a matter of course. The guide members 131a and 131b are provided with the grooves 133. The grooves 133 are provided so as to extend in the longitudinal direction on the insides of the guide members 131a and 131b, that is, on the sides where the guide members 131a and 131b face each other. Each groove 133 is provided with the curved section 134 which is moderately curved toward one end side.

As shown in FIG. 14, both ends of the connecting plate 132 are folded upward and are further folded to the outside to form sections for mounting the guide members 131a and 131b, thereby allowing the guide members 131a and 131b to be firmly mounted with the connecting plate 132. At this time, protrusions 138 which are provided at both ends of the upper surface of each of the guide members 131a and 131b are fitted into notches 139 which are formed at both ends of the folded portions of the connecting plate 132, thereby allowing the guide members 131a and 131b to be mounted to the connecting plate 132. Further, the strength of the connecting plate 132 can be increased by providing the folded portions at both ends of the connecting plate 132 as described above.

In the portable device according to this exemplary embodiment described above, the grooves 133 of the guide members 131a and 131b with which the engaging sections 227a and 227b and the shield member sliding pins 232 are engaged are used in common. Alternatively, grooves to be engaged with the engaging sections 227a and 227b and grooves to be engaged with the shield member sliding pins 232 may be provided separately.

In the portable device according to this exemplary embodiment described above, the shielding plate 231 is configured to be folded to the inside of the lower unit 200. However, the shielding plate 231 may be configured to be folded to the outside of the lower unit 200. In this case, the mounting holes 226 for the rotating pins 233 are provided in the lower case 210, for example.

Figure 15:
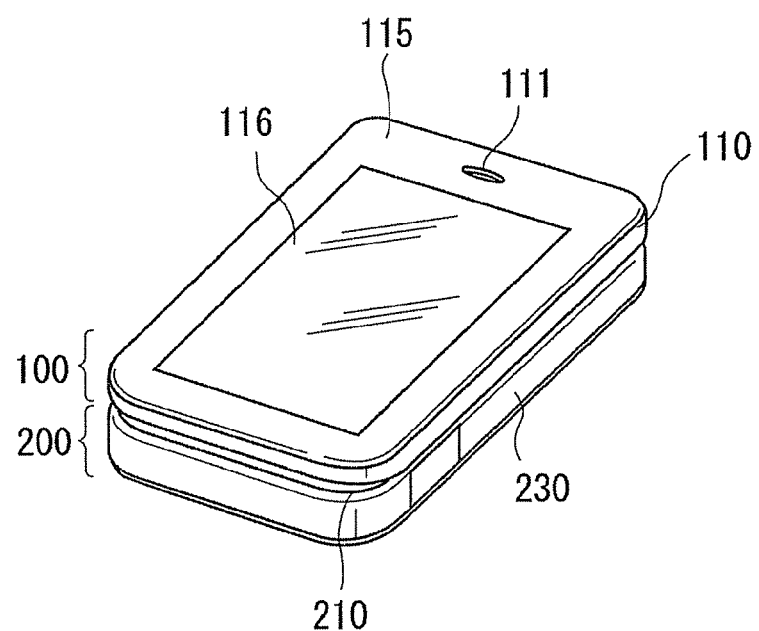
FIG. 15 is a perspective view showing another aspect of the portable device according to an exemplary embodiment.

The portable device according to this exemplary embodiment is also applicable to a portable device in which the display-unit cover 116 as shown in FIG. 15 functions as a touch panel, for example. In this case, as shown in FIG. 15, the key operation unit 113, which is provided in the portable device shown in FIG. 1, can be omitted. Especially, in the portable device in which the upper unit 100 shown in FIG. 15 includes a touch panel, a load is added to the upper unit 100 when the touch panel is manipulated in the extended state. In the portable device according to this exemplary embodiment, however, the strength of the portable device can be improved, which makes it possible to resist against a load even when the load is added to the upper unit 100.

The present invention has been described above with reference to exemplary embodiments, but the present invention is not limited to the above exemplary embodiments. The present invention can also include various modifications, corrections, and combinations that can be achieved by those skilled in the art within the scope of claims of the present invention, as a matter of course.

This application is based upon and claims the benefit of priority from Japanese patent application No. 2010-116122, filed on May 20, 2010, the disclosure of which is incorporated herein in its entirety by reference.

INDUSTRIAL APPLICABILITY

The present invention can be applied to portable devices having a sliding mechanism.

REFERENCE SIGNS LIST

100 UPPER UNIT
110 UPPER CASE
111 RECEIVER SOUND HOLE
113 KEY OPERATION UNIT
115 UPPER COVER
116 DISPLAY-UNIT COVER
131a, 131b GUIDE MEMBER
132 CONNECTING PLATE
133 GROOVE
134 CURVED SECTION
136, 137 CONNECTING MEMBER
138 PROTRUSION
139 NOTCH
200 LOWER UNIT
210 LOWER CASE
212 TALK HOLE
215 MOUNTING PART
220 SLIDING MEMBER
221 BASE
227a, 227b ENGAGING SECTION
228 MOUNTING HOLE
230 LOWER COVER
231 SHIELDING PLATE
232 SHIELDING MEMBER SLIDE PIN
233 ROTATING PIN
234 WALL SURFACE
235 SHIELDING MEMBER
240 CONNECTION CABLE
250 TORSION SPRING

The invention claimed is:

1. A portable device comprising:
a first unit including a guide member with a groove, the first unit extending in a sliding direction;
a second unit comprising a sliding member that slides in the groove of the guide member; and
a shield member that shields a boundary portion between the first unit and the second unit in an extended state where the first unit is extended with respect to the second unit, the boundary portion being formed when the second unit is inclined at a predetermined angle with respect to the first unit, wherein
the groove of the guide member comprises a curved section that makes the first unit incline at the predetermined angle with respect to the second unit in the extended state, and
one end of the shield member is rotatably supported at an end of the second unit, and the other end of the shield member is slidably engaged with the groove of the guide member.

2. The portable device according to claim 1, wherein the shield member is inclined with respect to the second unit when the other end of the shield member rotates around the one end of the shield member in the extended state.

3. The portable device according to claim 1, wherein a line connecting the one end where the shield member is rotatably supported and the other end where the shield member is slidably engaged with the groove of the guide member intersects substantially perpendicularly with a principal surface of the first unit in the extended state.

4. The portable device according to claim 3, wherein the shield member acts as a fulcrum with respect to a load acting on the first unit.

5. The portable device according to claim 1, wherein the shield member is folded to an inside of the second unit in a retracted state of the portable device.

6. The portable device according to claim 1, wherein
the shield member includes: a shielding plate; wall surfaces respectively provided at both ends of the shielding plate; a rotating pin and a shield member sliding pin, the rotating pin and the shield member sliding pin being provided to project outward from the wall surfaces, and
the rotating pin provided at the one end of the shield member is rotatably supported at an end of the second unit, and the shield member sliding pin provided at the other end of the shield member is slidably engaged with the groove of the guide member.

7. The portable device according to claim 1, wherein wall surfaces of the shield members are formed by folding both ends of the shielding plate toward the first unit, and the rotating pin and the shield member sliding pin are diagonally provided on the wall surfaces such that the rotating pin is located on a side of the second unit and the shield member sliding pin is located on a side of the first unit.

8. The portable device according to claim 1, wherein the groove of the guide member includes the curved section at one end side of the groove extending in the sliding direction.

9. The portable device according to claim 8, wherein the groove of the guide member is inclined at a predetermined angle with respect to a principal surface of the first unit in a range from the other end of the groove extending in the sliding direction to the curved section.

10. The portable device according to claim 1, wherein the guide members are respectively placed at both ends of the first unit, and the guide members are fabricated by cutting, forging, or casting and are bonded to a connecting plate by welding, gluing, or adhesion.

11. The portable device according to claim 2, wherein a line connecting the one end where the shield member is rotatably supported and the other end where the shield member is slidably engaged with the groove of the guide member intersects substantially perpendicularly with a principal surface of the first unit in the extended state.

12. The portable device according to claim 2, wherein the shield member is folded to an inside of the second unit in a retracted state of the portable device.

13. The portable device according to claim 3, wherein the shield member is folded to an inside of the second unit in a retracted state of the portable device.

14. The portable device according to claim 4, wherein the shield member is folded to an inside of the second unit in a retracted state of the portable device.

15. The portable device according to claim 2, wherein
the shield member includes: a shielding plate; wall surfaces respectively provided at both ends of the shielding plate; a rotating pin and a shield member sliding pin, the rotating pin and the shield member sliding pin being provided to project outward from the wall surfaces, and
the rotating pin provided at the one end of the shield member is rotatably supported at an end of the second unit, and the shield member sliding pin provided at the other end of the shield member is slidably engaged with the groove of the guide member.

16. The portable device according to claim 3, wherein
the shield member includes: a shielding plate; wall surfaces respectively provided at both ends of the shielding plate; a rotating pin and a shield member sliding pin, the rotating pin and the shield member sliding pin being provided to project outward from the wall surfaces, and the rotating pin provided at the one end of the shield member is rotatably supported at an end of the second unit, and the shield member sliding pin provided at the other end of the shield member is slidably engaged with the groove of the guide member.

17. The portable device according to claim 4, wherein the shield member includes: a shielding plate; wall surfaces respectively provided at both ends of the shielding plate; a rotating pin and a shield member sliding pin, the rotating pin and the shield member sliding pin being provided to project outward from the wall surfaces, and the rotating pin provided at the one end of the shield member is rotatably supported at an end of the second unit, and the shield member sliding pin provided at the other end of the shield member is slidably engaged with the groove of the guide member.

18. The portable device according to claim 5, wherein the shield member includes: a shielding plate; wall surfaces respectively provided at both ends of the shielding plate; a rotating pin and a shield member sliding pin, the rotating pin and the shield member sliding pin being provided to project outward from the wall surfaces, and the rotating pin provided at the one end of the shield member is rotatably supported at an end of the second unit, and the shield member sliding pin provided at the other end of the shield member is slidably engaged with the groove of the guide member.

19. The portable device according to claim 2, wherein wall surfaces of the shield members are formed by folding both ends of the shielding plate toward the first unit, and the rotating pin and the shield member sliding pin are diagonally provided on the wall surfaces such that the rotating pin is located on a side of the second unit and the shield member sliding pin is located on a side of the first unit.

20. The portable device according to claim 3, wherein wall surfaces of the shield members are formed by folding both ends of the shielding plate toward the first unit, and the rotating pin and the shield member sliding pin are diagonally provided on the wall surfaces such that the rotating pin is located on a side of the second unit and the shield member sliding pin is located on a side of the first unit.

* * * * *